US 9,350,194 B2

(12) United States Patent
Desrosiers (10) Patent No.: US 9,350,194 B2
(45) Date of Patent: May 24, 2016

(54) LIMITING WIRELESS POWER RECEIVER VOLTAGE

(71) Applicant: Broadcom Corporation, Irvine, CA (US)

(72) Inventor: Ryan Michael Desrosiers, Fort Collins, CO (US)

(73) Assignee: BROADCOM CORPORATION, Irvine, CA (US)

(*) Notice: Subject to any disclaimer, the term of this patent is extended or adjusted under 35 U.S.C. 154(b) by 381 days.

(21) Appl. No.: 13/911,207

(22) Filed: Jun. 6, 2013

(65) Prior Publication Data

US 2014/0333142 A1 Nov. 13, 2014

Related U.S. Application Data

(60) Provisional application No. 61/821,121, filed on May 8, 2013.

(51) Int. Cl.
*H01F 37/00* (2006.01)
*H02J 7/02* (2016.01)
*H02J 7/00* (2006.01)

(52) U.S. Cl.
CPC ......... *H02J 7/025* (2013.01); *H02J 2007/0037* (2013.01)

(58) Field of Classification Search
CPC ........... H02J 5/005; H02J 17/00; H02J 7/025; H02J 2007/0037
USPC ....................................................... 307/104
See application file for complete search history.

(56) References Cited

U.S. PATENT DOCUMENTS

| | | | | |
|---|---|---|---|---|
| 2008/0088399 A1* | 4/2008 | Mayo | ...................... | H02J 5/005 336/118 |
| 2009/0243397 A1* | 10/2009 | Cook | ...................... | H02J 5/005 307/104 |
| 2012/0235506 A1* | 9/2012 | Kallal | ...................... | H02J 5/005 307/104 |
| 2012/0306284 A1* | 12/2012 | Lee | ......................... | H02J 17/00 307/104 |
| 2013/0049482 A1* | 2/2013 | Rofe | ....................... | H02J 5/005 307/104 |
| 2013/0077360 A1* | 3/2013 | Low | ........................ | H02J 5/005 363/47 |
| 2013/0099585 A1* | 4/2013 | Von Novak | ............ | H02J 5/005 307/104 |
| 2013/0285618 A1* | 10/2013 | Iijima | ..................... | H02J 17/00 320/137 |
| 2014/0152117 A1* | 6/2014 | Sankar | ..................... | H03H 7/40 307/104 |

* cited by examiner

*Primary Examiner* — Jared Fureman
*Assistant Examiner* — Alfonso Perez Borroto
(74) *Attorney, Agent, or Firm* — Oblon, McClelland, Maier & Neustadt, L.L.P.

(57) ABSTRACT

Disclosed are various embodiments for controlling voltage in a wireless power receiver. A wireless power receiver may comprise an electromagnetic coil configured to receive a current induced by a magnetic flux generated by a wireless power transmitter and a comparator configured to compare a voltage generated by the induced current to a threshold voltage indicating a capability of circuitry coupled to the wireless power receiver. In the event the voltage generated by the induced current exceeds the threshold voltage, the voltage may be limited to a safe value.

21 Claims, 10 Drawing Sheets

LIMITING WIRELESS POWER RECEIVER VOLTAGE

CROSS-REFERENCE TO RELATED APPLICATIONS

This application claims the benefit of and priority to U.S. Provisional Application Ser. No. 61/821,121, filed May 8, 2013, which is incorporated by reference herein in its entirety.

BACKGROUND

Power may be transmitted wirelessly from a transmitter to a receiver in an electronic device, wherein the receiver may be used to provide power to hardware and/or circuitry coupled to the receiver. For example, a transmitter comprising a transmitter coil may generate a magnetic flux to be applied across a receiver coil in a receiver, thereby wirelessly inducing current in the receiver.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to controlling voltage in a wireless power receiver. Power may be transmitted wirelessly from a wireless power transmitter to a wireless power receiver within or otherwise coupled to an electronic device, wherein the wireless power receiver may be used to provide power to hardware and/or circuitry within the electronic device. For example, a wireless power transmitter comprising a transmitter coil may generate a magnetic flux to be applied across a receiver coil in a wireless power receiver, thereby wirelessly inducing a voltage in the wireless power receiver. As may be appreciated, resonant wireless power receivers lack control over the magnetic flux applied to the receiver coil. A high magnetic flux may induce a voltage in the receiver exceeding voltage limits of the hardware and/or circuitry within an electronic device as well as circuitry in the wireless power receiver itself.

Generally, to prevent a voltage exceeding voltage capabilities of a receiver, the magnetic flux generated via the transmitter coil is reduced. This results in a reduced power transfer for circuits, hardware, and/or devices that are using the transmitter to receive power. Similarly, the dimensions of the receiver coil may be modified to reduce the received voltage. This may result in reduced convenience and/or usability of a wireless power system.

According to various embodiments of the present disclosure, a voltage induced in a wireless power receiver by a wireless power transmitter may be controlled in the wireless power receiver hysteretically, thereby permitting the wireless power transmitter to operate with a maximum magnetic flux. In this embodiment, a reduction in receiver coil dimensions is not required, thus granting maximum positional freedom for achieving a wireless power system. Control over the voltage induced in a wireless power receiver may be employed using a comparator configured to compare a voltage generated by the induced current to a threshold voltage indicating a capability of circuitry coupled to the wireless power receiver. In the event the voltage generated by the induced current exceeds the threshold voltage, the voltage may be limited to a safe value.

In the following discussion, a general description of the system and its components is provided, followed by a discussion of the operation of the same.

Figure 1:
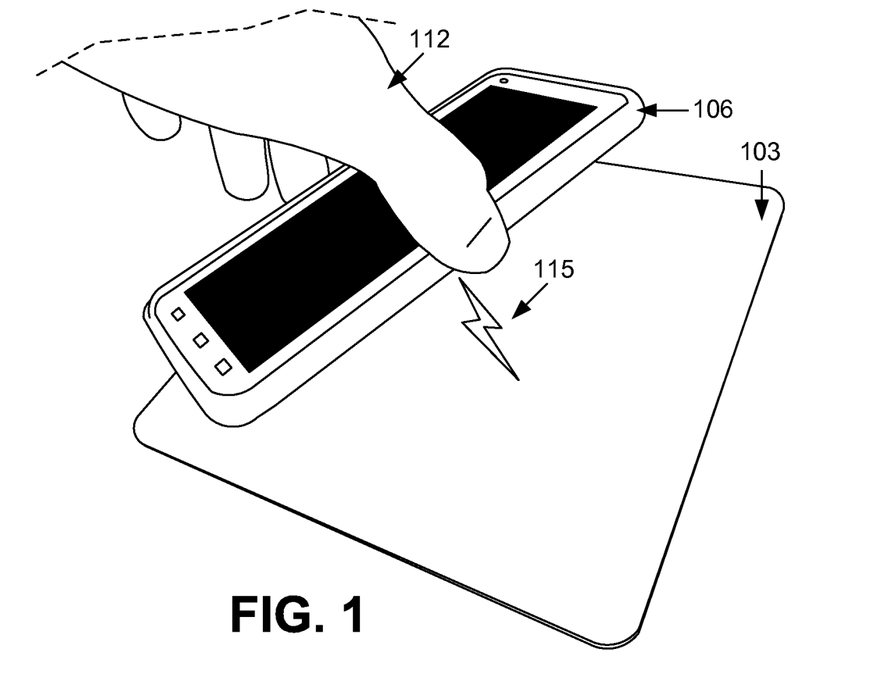
FIG. 1 is a drawing of a wireless charging pad powering a portable device according to various embodiments of the present disclosure.

With reference to FIG. 1, shown is a charging station 103 that may be used in the wireless charging of a portable device 106. A portable device 106 may be embodied as a portable computer, a laptop computer, personal digital assistants, cellular telephones, smartphones, music players, web pads, tablet computer systems, portable game consoles, electronic book readers, or other devices with similar capability. The charging station 103, acting as a wireless power transmitter, may be connected to a power source (not shown) such as a battery or an electrical outlet connected to a power grid.

When a person 112 physically places a portable device 106 on or near the charging station 103, the charging station 103 may provide for wireless power transmission 115 by wirelessly inducing a voltage in a receiver (not shown) located within or otherwise connected to the portable device 106, thereby transferring power from the power source connected to the charging station 103 to the portable device 106. The power may be used, for example, to charge a battery (not shown) in the portable device 106. Similarly, the power may be used to directly power circuitry or hardware in the portable device 106.

Prior to transferring power by generating a magnetic flux in the transmitter (e.g., the charging station 103), communication between the charging station 103 and the portable device 106 may be established, thereby permitting the portable device 106 to transmit requests of the portable device 106 to the charging station 103. For example, requests may comprise capabilities of the portable device 106 such as voltage capabilities of hardware and/or circuitry within the portable device 106. Communication between the charging station 103 and the portable device 106 may be accomplished using various wireless mediums of communication such as Bluetooth, Zygbee, Infared (IR), and/or various other types of communication. As can be appreciated, conflicts may arise when multiple portable devices 106 are placed on or near the charging station 103, as multiple portable devices 106 may communicate varying voltage capabilities, as will be discussed in greater detail below.

Figure 2:
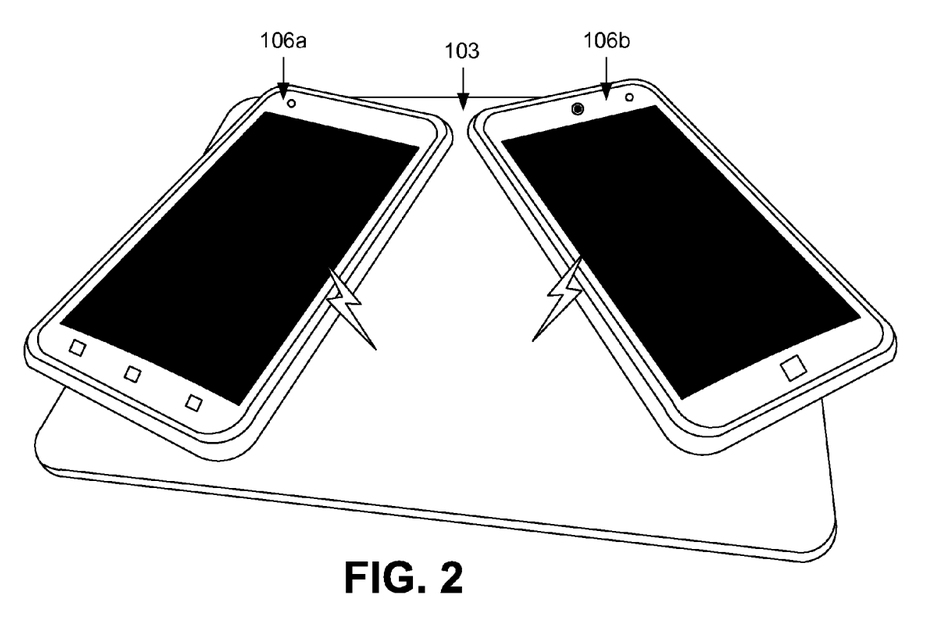
FIG. 2 is a drawing of a wireless charging pad powering multiple portable devices according to various embodiments of the present disclosure.

Referring next to FIG. 2, shown is a charging station 103 that may be used in the wireless charging of a plurality of portable devices 106a and 106b. As discussed above with respect to FIG. 1, a portable device 106 may be embodied as a portable computer, a laptop computer, personal digital assistants, cellular telephones, smartphones, music players, web pads, tablet computer systems, portable game consoles, electronic book readers, or other devices with similar capability.

By physically placing multiple portable devices (e.g., 106a and 106b) on or near the charging station 103, the charging station 103 may wirelessly induce a voltage in multiple receivers (not shown) within the multiple portable devices 106. As can be appreciated, the voltage capabilities of a first portable device 106a may vary from the voltage capabilities of a second portable device 106b. For example, hardware and/or circuitry within a first portable device 106a may be able to withstand 20 Volts (V) while hardware and/or circuitry within the second portable device 106b may be able to withstand 50V. Additionally, the placement of the portable devices 106 on the charging station 103 may affect the charging of the portable devices 106.

The voltage capabilities of the multiple portable devices 106 may be communicated to and recognized by the charging station 103. To accommodate the portable device 106a that only can withstand 20V, traditional approaches may require the charging station 103 to reduce a magnetic flux generated by the charging station 103 that induces voltages in the portable devices 106a and 106b. This may affect the charging and/or powering of the second portable device 106b capable of withstanding a higher voltage (i.e., 50V), especially if the placement of the portable devices 106 on the charging station 103 is not optimal. Thus, it may be beneficial to account for voltages induced by a transmitter (e.g., the charging station 103) in one or more wireless power receivers within or otherwise coupled to the portable devices 106. To this end, a high magnetic flux may be generated to accommodate the portable device 106b capable of withstanding a higher voltage while not impairing the portable device 106a capable of withstanding a lower voltage.

Figure 3:
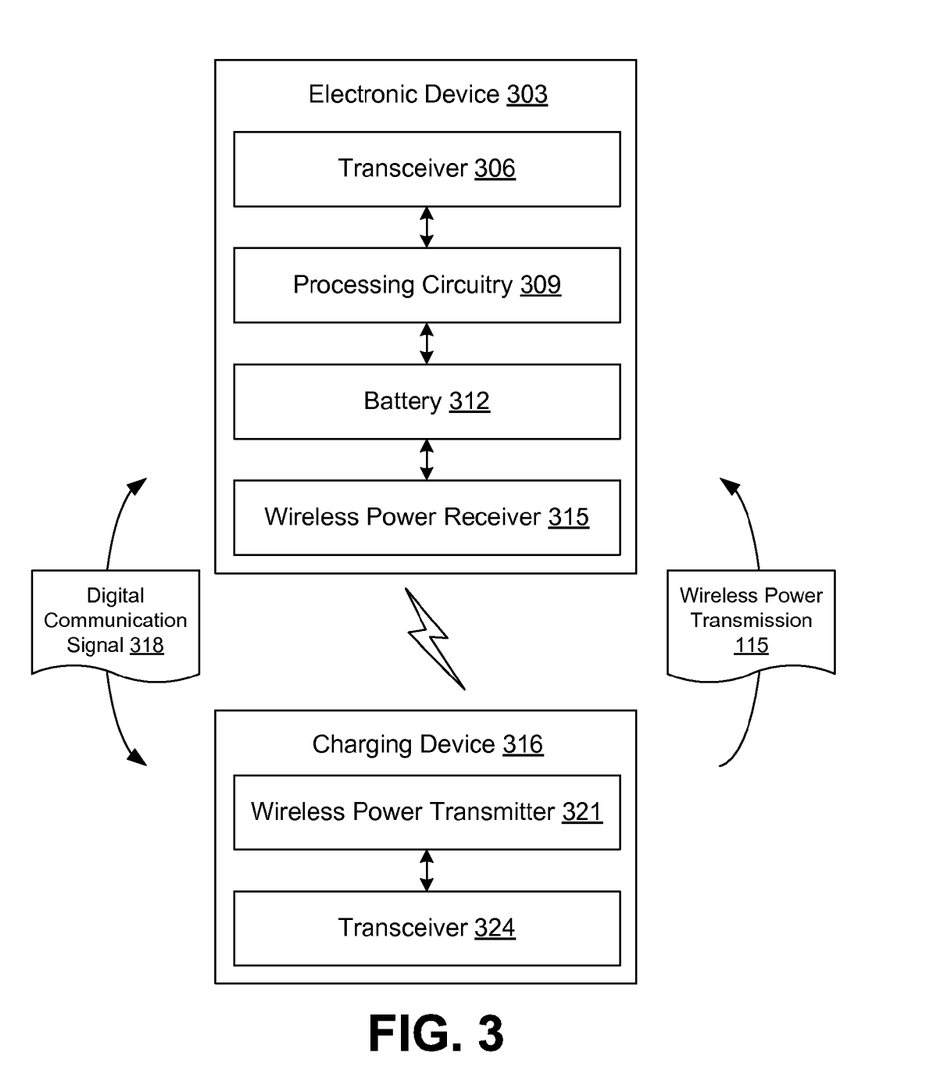
FIG. 3 is a drawing of a schematic block diagram that provides one example illustration of a transmitter and receiver configured to wirelessly receive power according to various embodiments of the present disclosure.

Turning now to FIG. 3, shown is a schematic block diagram that provides one example illustration of a transmitter and receiver configured to wirelessly receive power according to various embodiments of the present disclosure. An electronic device 303, such as portable device 106 (FIG. 1), may comprise a transceiver 306, processing circuitry 309, a battery 312, and/or a wireless power receiver 315. The transceiver 306 may comprise, for example, a Bluetooth transceiver configured to enable communication between the charging device 316, such as charging station 103 (FIG. 1), and the electronic device 303 by transmitting and/or receiving one or more digital communication signals 318. Similarly, according to various embodiments, the transceiver 306 may comprise a Zygbee and/or IR transceiver.

A charging device 316 may comprise a wireless power transmitter 321 and/or a transmitter transceiver 324. The transmitter transceiver 324 may comprise, for example, a Bluetooth transceiver configured to enable communication between the charging device 316 and the electronic device 303 by transmitting and/or receiving one or more digital communication signals 318. Similarly, the transmitter transceiver 324 may comprise a Zygbee and/or IR transceiver. The transmitter transceiver 324 may support communications with multiple electronic devices 303.

When communication is established between the electronic device 303 and the charging device 316, the charging device 316 may conduct wireless power transmission 115 from the wireless power transmitter 321 to the wireless power receiver 315 within the electronic device 303, for example, according to capabilities provided in the digital communication signals 318. As a non-limiting example, a wireless power transmitter 321 may comprise an electromagnetic coil capable of generating a magnetic flux across an electromagnetic coil within the wireless power receiver 315, the magnetic flux inducing a voltage in the wireless power receiver 315. A current may result from the voltage, as can be appreciated, that may be used to charge the battery 312 within the electronic device 106 and/or to directly power the processing circuitry 309 within or otherwise coupled to the electronic device 303. The transceiver 306 in the electronic device 303 may be used to communicate to the charging device 316 when the wireless power transmitter 321 should terminate a wireless power transmission 115, such as when the battery 312 has been fully charged.

Figure 4:
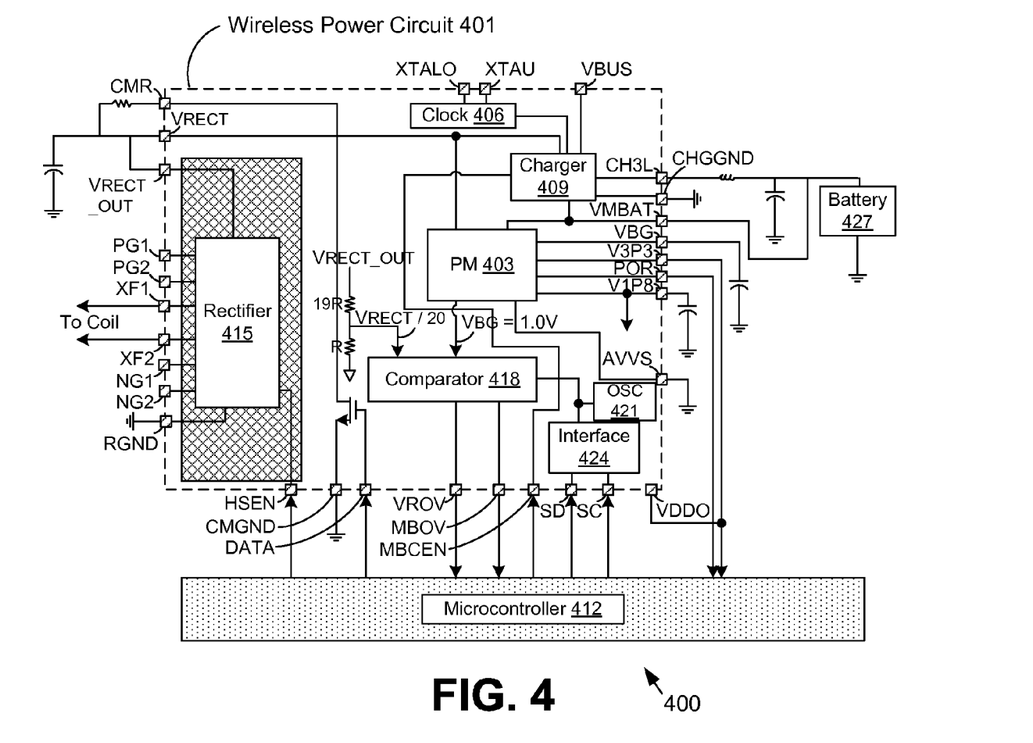
FIG. 4 is an integrated circuit diagram configured to control voltage in a wireless power receiver according to various embodiments of the present disclosure.

Moving on to FIG. 4, shown is a power control circuit 400 configured to control voltage in a wireless power receiver 315 according to various embodiments of the present disclosure. In the non-limiting example of FIG. 4, a power control circuit 400 may comprise a wireless power circuit 401 according to various embodiments. The wireless power circuit 401 may comprise, for example, a power manager 403, a clock 406, a battery charger 409, a rectifier 415, one or more comparators 418, a resistor-capacitor (RC) oscillator 421, an interface 424 including a bus/register map, and/or other components that may be employed to control voltage in a receiver. The wireless power circuit 401 may interface with a microcontroller 412, a battery 427, and other components of the receiver.

The power manager 403 may be configured to manage power requirements for a host system (e.g., an electronic device 303 (FIG. 3)). The clock 406 may be configured to provide the power control circuit 400 with a repetitive signal such as a sine wave or a square wave. According to various embodiments, the clock 406 may comprise a crystal clock (XO) oscillator and/or a phase-locked loop (PLL) clock oscillator.

The microcontroller 412 may comprise a processor, memory, and/or programmable I/O peripherals. According to various embodiments, the microcontroller 412 may comprise a NuvoTon NCU120 microcontroller, or like component. The rectifier 415 may be configured to convert alternating current (AC) to direct current (DC).

The one or more comparators 418 are configured to compare two voltages or currents and provide an output indicating which of the two voltages has a greater voltage. In the non-limiting example of FIG. 4, a comparator 418 is configured to compare a received voltage that has been rectified ($V_{RX}$, depicted in FIG. 4 as $V_{RECT}$) to a threshold voltage ($V_{TH}$, depicted in FIG. 4 as $V_{BG}$). As will be discussed in greater detail below, a bandgap voltage $V_{BG}$ may be used to compare the received voltage to a voltage indicating the voltage capabilities of the system coupled to the wireless power circuit 401. The received voltage ($V_{RX}$, depicted in FIG. 4 as $V_{RECT\_OUT}$) may be reduced or amplified at the comparator 418 as depicted in FIG. 4. For example, the received voltage ($V_{RX}$, depicted in FIG. 4 as $V_{RECT\_OUT}$) may be reduced using a resistance bridge or other one or more components to appropriately reduce the received voltage prior to a comparison in the comparator 418 between the received voltage and the bandgap voltage. In the non-limiting example of FIG. 4, the bandgap voltage may be set as 1.0V although the bandgap voltage may be any other voltage indicating the capabilities of the system coupled to the wireless power circuit 401. Similarly, the resistance of the resistance bridge may be modified to provide an appropriate voltage to the comparator 418. According to various embodiments of the present disclosure, the received voltage ($V_{RX}$, depicted in FIG. 4 as $V_{RECT}$) may be compared to a threshold voltage of the battery ($V_{MBAT}$) in the comparator 418, wherein the threshold voltage indicates the maximum voltage capabilities of the battery coupled to the system.

As discussed above, a threshold voltage may indicate the capabilities of a system, hardware, and/or circuitry comprising or otherwise connected to the power control circuit 400. In the non-limiting example of FIG. 4, the wireless power circuit 401 is coupled to a battery 427 that may power an electronic device 303. Accordingly, the threshold voltage ($V_{TH}$, depicted in FIG. 4 as $V_{MBAT}$) may reflect the maximum reliability voltage for the particular battery 427 coupled to the power control circuit 400. Accordingly, the received voltage is converted from an AC signal to a DC signal ($V_{RX}$, depicted in FIG. 4 as $V_{RECT\_OUT}$) and used as an output voltage ($V_{RECT}$). According to various embodiments, the wireless power circuit 401 of FIG. 4 may be embodied in a single chip.

Figure 5:
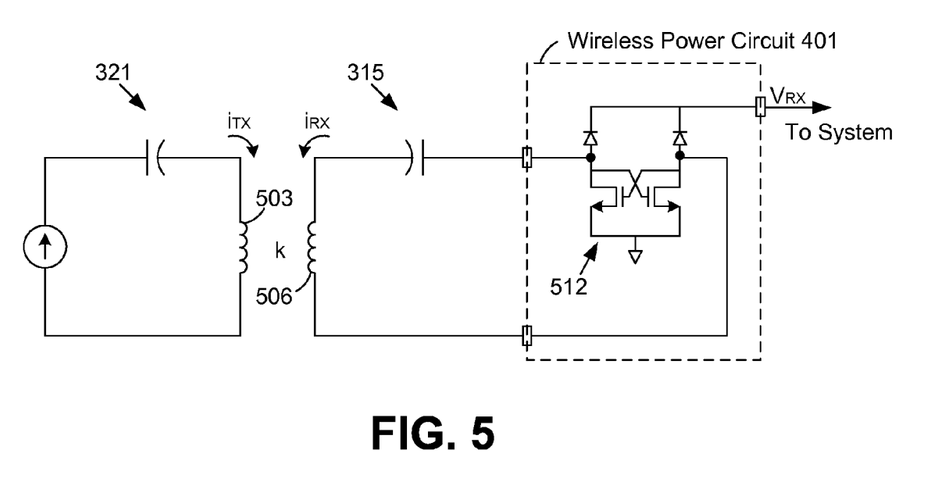
FIG. 5 is a drawing of a circuit diagram comprising a wireless power receiver and a wireless power transmitter according to various embodiments of the present disclosure.

With reference to FIG. 5, shown is an example of a circuit diagram of a wireless power receiver 315 and a wireless power transmitter 321 according to various embodiments of the present disclosure. A wireless power transmitter 321 may comprise, for example, an electromagnetic coil 503 configured to generate a magnetic field. A wireless power receiver 315 located within the magnetic field may couple with the magnetic flux via an electromagnetic coil 506 within the wireless power receiver 315. A wireless power circuit 401 includes a rectification circuit 512 coupled to the electromagnetic coil 506 that may comprise one or more transistors, diodes, or other components that prepare the voltage induced by the magnetic flux for use by a system (e.g., by circuits and/or hardware of an electronic device 303 (FIG. 3)). Accordingly, the voltage induced in the wireless power receiver 315 may be passed directly to the system. If the voltage exceeds a voltage capability of the system, the system may be damaged or otherwise impaired.

The current ($i_{RX}$) from the electromagnetic coil 506 is an AC current that is sent to the rectification circuit 512 for conversion to DC. As a non-limiting example, the rectification circuit 512 may comprise diodes, transistors, and/or metal-oxide-semiconductor (MOS) devices such as N-channel metal-oxide-semiconductor (NMOS) devices and/or P-channel metal-oxide-semiconductor (PMOS) devices. The output of the rectification circuit 512 is a DC voltage ($V_{RX}$) that can be used by the system. For example, the DC voltage may be used to power a battery in a portable device 106 (e.g., a mobile phone, tablet, computer).

The AC current ($i_{RX}$) in the wireless power receiver 315 is a function of the Tx/Rx coil dimensions, transmitter current, and coupling factor (k). The coupling factor (k) varies significantly depending on where a user places an electronic device 303 (FIG. 3) on or near a charging device 316 (FIG. 3). For a large coupling factor (k), a high voltage level is provided in the wireless power receiver 315 resulting in a large received voltage ($V_{RX}$). In Alliance for Wireless Power (A4WP) systems, this voltage can be as high as 30V. Such a high voltage may make it difficult for integrated circuits to connect to the received voltage ($V_{RX}$) as it requires a very high voltage process.

Figure 6:
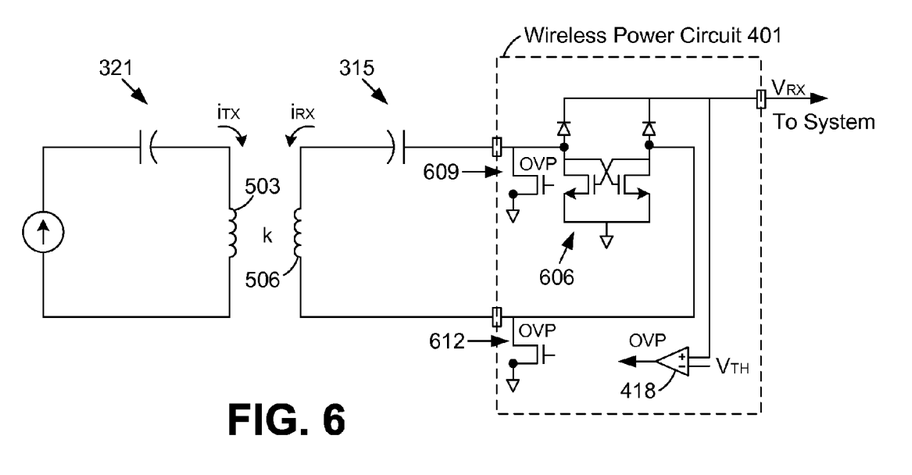
FIG. 6 is another drawing of a circuit diagram comprising a wireless power receiver and a wireless power transmitter according to various embodiments of the present disclosure.

Referring next to FIG. 6, shown is another example of a circuit diagram of a wireless power receiver 315 and a wireless power transmitter 321 according to various embodiments of the present disclosure. As discussed above with respect to FIG. 5, a wireless power transmitter 321 may comprise, for example, an electromagnetic coil 503 configured to generate a magnetic field. A wireless power receiver 315 located within the magnetic field couples to the magnetic flux with an electromagnetic coil 506 within or otherwise coupled to the wireless power receiver 315.

In the non-limiting example of FIG. 6, a wireless power circuit 401 coupled to the electromagnetic coil 506 may comprise a rectification circuit 606 that may comprise at least two metal-oxide-semiconductor (MOS) devices, a comparator 418 to control the at least two MOS devices, and one or more overvoltage components, as will be discussed in greater detail below. The rectification circuit 606 is configured to prepare a voltage induced by the magnetic flux for use by a system (e.g., by circuits and/or hardware of an electronic device 303 (FIG. 3)). The comparator 418 may compare a received voltage ($V_{RX}$) to a threshold voltage ($V_{TH}$). As may be appreciated, the comparator 418 can provide an output based upon which of the two voltages has a greater voltage. The output of the comparator 418 can be used to control overvoltage protection components (e.g., 609 and 612). If the received voltage exceeds the threshold voltage, the overvoltage protection components (e.g., 609 and 612) MOS-type devices may shunt the current ($i_{RX}$) in the wireless power receiver 315 and/or the wireless power circuit 401, thereby causing the voltage ($V_{RX}$) to be less than or equal to the threshold voltage ($V_{TH}$). The threshold voltage ($V_{TH}$) may be predefined via the components of the circuit or programmatically predefined and may indicate a voltage at which the system may safely operate. According to various embodiments, the at least two MOS devices 609 and 612 may be configured at a low resistance (e.g., approximately 250 mOhms), resulting in negligible power loss in the system while the transmitter current is being shunted from the rectified voltage output ($V_{RX}$) to ground.

According to an additional embodiment, if the received voltage exceeds the threshold voltage ($V_{RX}>V_{TH}$, detected by the comparator 418), a digital communication signal 318 may be communicated by the transceiver 306 from the wireless power receiver 315 to a transmitter transceiver 324 within and/or coupled to the charging device 316 that is capable of communicating with the wireless power transmitter 321. The transceiver 306 may comprise, for example, a Bluetooth transceiver within the electronic device 303. Although the high voltage is accounted for in the wireless power receiver 315, the transceiver 306 may notify the wireless power transmitter 321 that the wireless power receiver 315 has received too high of a voltage, permitting the wireless power transmitter 321 to adjust its generation of magnetic flux to a predefined level and/or a level defined in the communication, although the wireless power transmitter 321 may not do this if more than one electronic device 303 is being powered by the wireless power transmitter 321.

Figure 7:
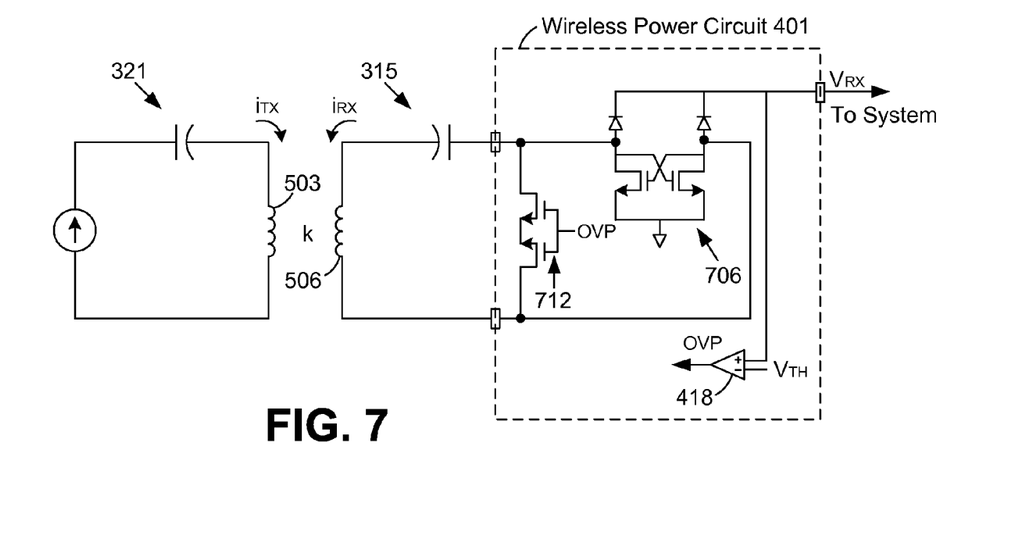
FIG. 7 is yet another drawing of a circuit diagram comprising a wireless power receiver and a wireless power transmitter according to various embodiments of the present disclosure.

Turning now to FIG. 7, shown is yet another example of a circuit diagram of a wireless power receiver 315 and a wireless power transmitter 321 according to various embodiments of the present disclosure. As discussed above with respect to FIGS. 5 and 6, a wireless power transmitter 321 may comprise, for example, an electromagnetic coil 503 configured to generate a magnetic field. A wireless power receiver 315 located within the magnetic field may receive magnetic flux within an electromagnetic coil 506 of the wireless power receiver 315.

In the non-limiting example of FIG. 7, a wireless power circuit 401 coupled to the electromagnetic coil 506 may comprise a rectification circuit 706 that may comprise diodes, transistors, and/or MOS devices and a comparator 418 to control the diodes, transistors, and/or MOS devices. The rectification circuit 706 is configured to prepare a voltage induced by the magnetic flux for use by a system (e.g., circuits and/or hardware of an electronic device 303 (FIG. 3)). The comparator 418 may compare a received voltage ($V_{RX}$) to a threshold voltage ($V_{TH}$).

As depicted in FIG. 7, an implementation of controlling the voltage in a wireless power receiver 315 may comprise shorting the electromagnetic coil 506 within or otherwise coupled to the wireless power receiver 315 using one or more MOS-type devices 712 during overvoltage protection, thereby negating the effect of the electromagnetic coil 506 on the wireless power receiver 315. Accordingly, if the received voltage exceeds the threshold voltage, the overvoltage protection components may short the electromagnetic coil 506 until the voltage in the wireless power receiver 315 and/or the wireless power circuit 401 returns to a state of being less than or equal to the threshold voltage ($V_{TH}$). The threshold voltage ($V_{TH}$) may be predefined via the components of the circuit or programmatically predefined and may indicate a voltage at which the system may safely operate.

Figure 8:
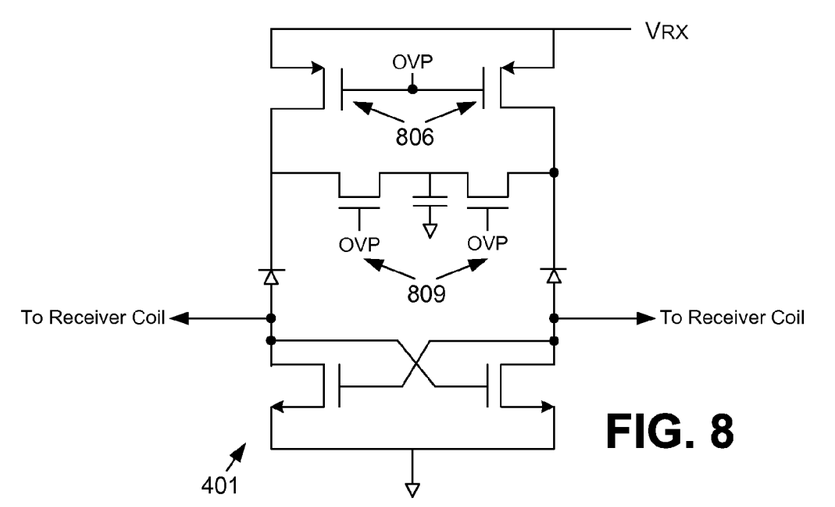
FIG. 8 is yet another drawing of a circuit diagram comprising a wireless power receiver according to various embodiments of the present disclosure.

Moving on to FIG. 8, shown is yet another example of a circuit diagram of a portion of a wireless power receiver 315 that may be configured to receive and/or control power from a wireless power transmitter 321 (FIG. 3) according to various embodiments of the present disclosure. In the non-limiting example of FIG. 8, a wireless power circuit 401 may comprise one or more isolation switches 806 that may be employed in overvoltage protection. The functionality of the circuit diagram may be expressed as:

$$\text{If } V_{RX} > V_{TH}, \text{Then OVP=High, Else OVP=Low} \quad \text{(eq. 1)}.$$

Accordingly, in the event a received voltage exceeds a threshold voltage, the one or more isolation switches 806 (acting as high side switches) may be initiated to turn off the received voltage ($V_{RX}$) from the electromagnetic coil (not shown) within or otherwise coupled to the wireless power receiver 315 until the received voltage ($V_{RX}$) is less than or equal to the threshold voltage ($V_{TH}$). In addition, one or more overvoltage components 809 comprising transistors and/or MOS-type devices, may be turned on to shunt the current in the wireless power circuit 401. When a received voltage ($V_{RX}$) becomes less than or equal to the threshold voltage ($V_{TH}$), the isolation switches 806 turn on and the overvoltage components turn off, thereby permitting the wireless power circuit 401 to gain voltage from the electromagnetic coil (not shown). The threshold voltage ($V_{TH}$) may be predefined via the components of the circuit or programmatically predefined and may indicate a voltage at which the system may safely operate.

Figure 9:
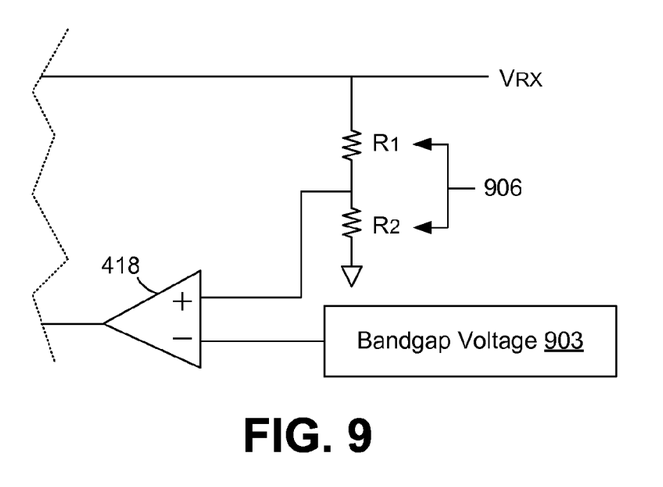
FIG. 9 is a drawing of a circuit diagram that may be employed in the generation of a threshold voltage used in overvoltage protection according to various embodiments of the present disclosure.

Moving on to FIG. 9, shown is an example of a portion of a circuit diagram that may be employed in the generation of a threshold voltage ($V_{TH}$) used in overvoltage protection according to various embodiments of the present disclosure. As discussed above, a comparator 418 may be employed in various embodiments to compare a received voltage ($V_{RX}$) to a threshold voltage ($V_{TH}$). The comparator 418 is configured to compare two voltages (e.g., $V_{RX}$ and $V_{TH}$) or currents and provide an output indicating which of the two voltages has a greater voltage. A bandgap voltage 903 may be employed to generate a threshold voltage that may indicate a voltage at which a system may safely operate. A system may comprise, for example, processing circuitry 309 within or otherwise coupled to an electronic device 303 (FIG. 3). As can be appreciated, the bandgap voltage 903 may be temperature independent. The circuit of FIG. 9 may further comprise one or more resistors 906, as can be appreciated.

Figure 10A:
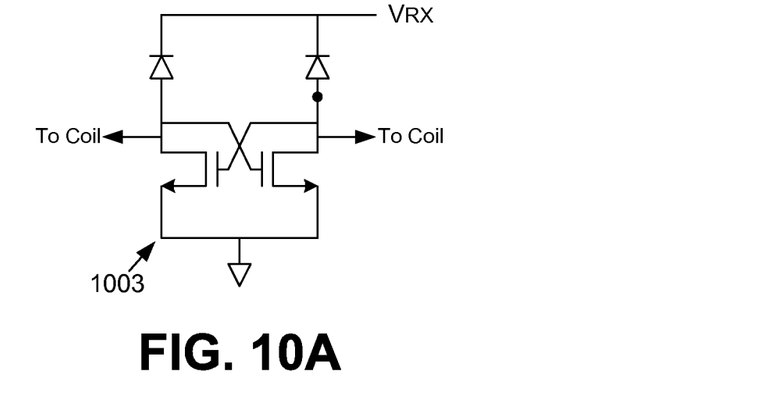
FIGS. 10A-B are drawings of circuit equivalents that may be employed in overvoltage protection according to various embodiments of the present disclosure.
Figure 10B:
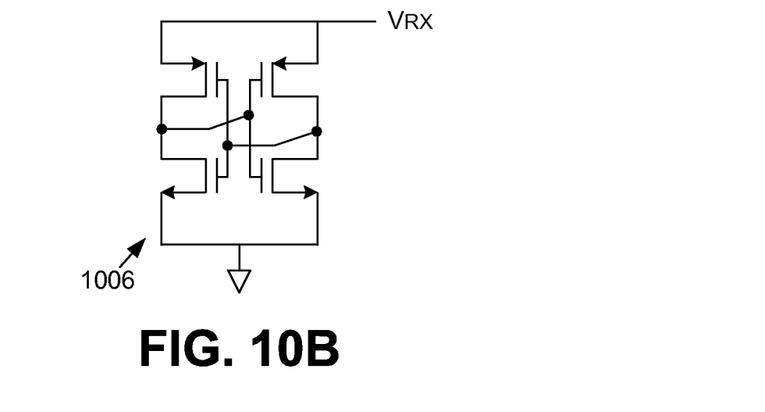

With reference to FIGS. 10A-B, shown are circuit equivalents that may be employed in the embodiments set forth in FIGS. 5-9. As shown in FIG. 10A, a rectification circuit may comprise an arrangement of one or more transistors 1003 and/or diodes configured to employ overvoltage protection as set forth in the present disclosure. Alternatively, as shown in FIG. 10B, a rectification circuit may comprise an arrangement of one or more MOS devices 1006 (e.g., PMOS devices and/or NMOS devices) configured to employ overvoltage protection as set forth in the present disclosure.

Figure 11:
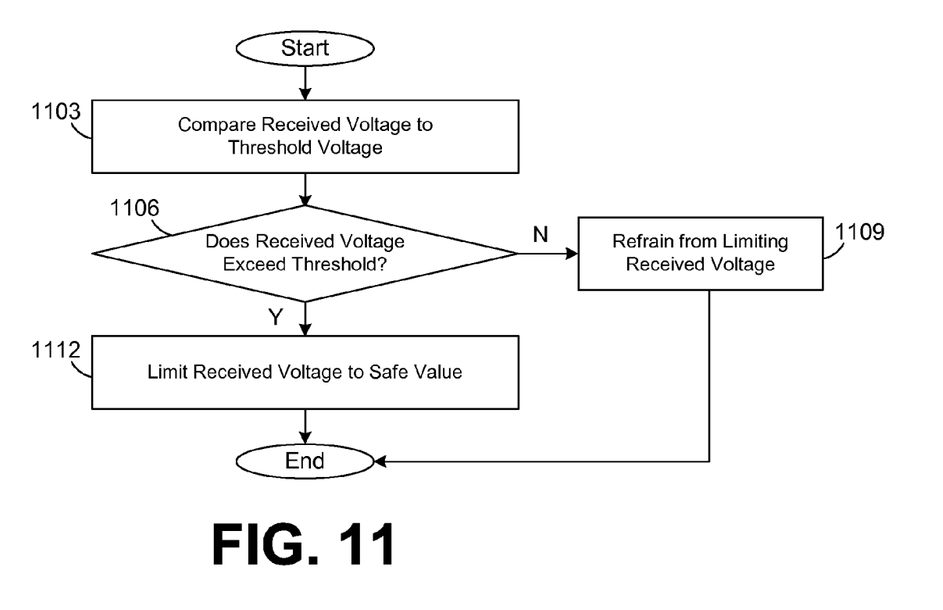
FIG. 11 is a flowchart illustrating one example of functionality implemented in a wireless power receiver according to various embodiments of the present disclosure.

Referring next to FIG. 11, shown is a flowchart that provides one example of the operation of controlling voltage in a wireless power receiver 315 (FIG. 3) according to various embodiments. It is understood that the flowchart of FIG. 11 provides merely an example of the many different types of functional arrangements that may be employed to implement the operation of the portion of the wireless power receiver as described herein. The flowchart of FIG. 11 may be viewed as depicting an example of steps of a method implemented in the wireless power receiver according to one or more embodiments.

Beginning with 1103, a wireless power receiver 315 may be configured to compare a voltage received in the wireless power receiver to a threshold voltage. A threshold voltage may comprise, for example, a voltage indicating the voltage capabilities of an electronic device such as a portable device 106 (FIG. 1). The threshold voltage ($V_{TH}$) may be predefined via the components of the circuit or programmatically predefined and may indicate a voltage at which the system may safely operate, as discussed with respect to FIG. 9. According to various embodiments of the present disclosure, a comparator 418 may be employed to compare the voltage received in the wireless power receiver 315 to a predefined threshold voltage. The comparator 418 is configured to compare two voltages (e.g., $V_{RX}$ and $V_{TH}$) or currents and provide a hysteretic output indicating which of the two voltages has a greater voltage.

Next, in 1106, it is determined in the wireless power receiver 315 whether the received voltage exceeds the threshold voltage. As may be appreciated, the comparator 418 is configured to compare the received voltage ($V_{RX}$) with the threshold voltage ($V_{TH}$) and provide an output responsive to which of the two voltages has a greater voltage.

If the received voltage does not exceed the threshold voltage, the wireless power receiver 315 may be configured to refrain from limiting the received voltage, in 1109. For example, the wireless power receiver 315 may refrain from affecting the received voltage ($V_{RX}$). Alternatively, in 1112, if the received voltage exceeds the threshold voltage, the wireless power receiver 315 may be configured to limit the received voltage to a particular voltage. For example, the received voltage may be limited to be less than or equal to a threshold voltage indicating the voltage capabilities of a device.

Limiting the received voltage ($V_{RX}$) to be less than or equal to a threshold voltage ($V_{TH}$) may be accomplished according to various embodiments discussed in the present disclosure. For example, one or more diodes, transistors, and/or MOS-type devices may be employed to shunt a current ($i_{RX}$) generated from a voltage induced in an electromagnetic coil 506

(FIG. 5) within or otherwise coupled to the wireless power receiver 315. In other embodiments, the diodes, transistors, and/or MOS-type devices may be put in a high impedance state to reduce the received voltage ($V_{RX}$). In another embodiment, one or more isolation switches 806 (FIG. 8) may be employed to, in effect, disconnect the wireless power receiver 315 from the electromagnetic coil 506 by shorting the electromagnetic coil 506. In yet another embodiment, the electromagnetic coil 506 coupled to the wireless power receiver 315 may be shorted using one or more diodes, transistors, and/or MOS-type devices, thereby negating the effect of the electromagnetic coil 506 on the wireless power receiver 315.

The flowchart of FIG. 11 shows the functionality and operation of portions of the wireless power receiver 315. If portions are embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in the portable device 106 (FIG. 1). The machine code may be converted from the source code, etc. If embodied in hardware, each block may represent a circuit or a number of interconnected circuits to implement the specified logical function(s).

Although the flowchart of FIG. 11 shows a specific order of execution, it is understood that the order of execution may differ from that which is depicted. For example, the order of execution of two or more blocks may be varied relative to the order shown. Also, two or more blocks shown in succession in FIG. 11 may be executed concurrently or with partial concurrence. Further, in some embodiments, one or more of the blocks shown in FIG. 11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Various systems described herein may be embodied in general-purpose hardware, dedicated hardware, software, or a combination thereof. If embodied in hardware, each block in FIG. 11 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, one or more programmable logic devices (e.g., a field programmable gate array (FPGA), a complex programmable logic device (CPLD), etc.), or other components, etc. Such technologies are generally well known by those skilled in the art and, consequently, are not described in detail herein.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A portable device comprising:
a wireless receiver configured to provide power to hardware of the portable device, the wireless receiver further configured to:
receive a voltage induced by a magnetic flux generated by a wireless power transmitter via an electromagnetic coil in the wireless receiver;
compare the received voltage to a threshold voltage; and
limit with respective direct shorting paths for both sides of the electromagnetic coil an output voltage provided to the hardware to less than or equal to the threshold voltage in response to the received voltage exceeding the threshold voltage,
wherein the direct shorting paths include one or more switches without a discrete impedance element connected in series to the one or more switches so as to immediately reduce the received voltage in response to the received voltage exceeding the threshold voltage.

2. The portable device of claim 1, the wireless receiver is further configured to refrain from limiting the output voltage in response to the received voltage not exceeding the threshold voltage.

3. The portable device of claim 1, further comprising a rectification circuit configured to convert the received voltage from alternating current (AC) to direct current (DC).

4. The portable device of claim 1, wherein the voltage is limited by shunting the received voltage to ground using at least one metal-oxide-semiconductor (MOS) device.

5. The portable device of claim 4, wherein the at least one MOS device comprises an N-Type Metal Oxide Semiconductor (NMOS) device.

6. The portable device of claim 1, wherein the threshold voltage indicates a safety voltage at which the hardware of the portable device safely operates.

7. The portable device of claim 1, wherein the wireless receiver is embodied in a single chip.

8. A method comprising:
receiving, by a wireless power circuit, a received voltage induced wirelessly by a wireless power transmitter;
comparing, by the wireless power circuit, the received voltage to a threshold voltage; and
limiting an output voltage of the wireless power circuit to less than or equal to the threshold voltage in response to the received voltage exceeding the threshold voltage, the output voltage provided by the wireless power circuit to hardware in a portable device wherein the limiting includes providing respective direct shorting paths for both sides of an electromagnetic coil of the wireless receiver via one or more switches without a discrete impedance element connected in series to the one or more switches so as to immediately reduce the received voltage when the received voltage exceeds the threshold voltage.

9. The method of claim 8, further comprising refraining from limiting the output voltage in response to the received voltage not exceeding the threshold voltage.

10. The method of claim 8, further comprising transmitting, by the wireless power circuit, a signal to the wireless power transmitter, the signal comprising an indication that the received voltage exceeds the threshold voltage.

11. The method of claim 8, further comprising converting the received voltage from alternating current (AC) to direct current (DC) via a rectification circuit in the wireless power circuit.

12. The method of claim 8, wherein the output voltage is limited by shunting the received voltage to ground using at least one metal-oxide-semiconductor (MOS) device.

13. The method of claim 12, wherein the at least one MOS device comprises an N-Type Metal Oxide Semiconductor (NMOS) device.

14. The method of claim 8, wherein the threshold voltage indicates a voltage level at which the hardware safely operates.

15. An apparatus comprising:
a wireless power receiver configured to provide hardware coupled to the wireless power receiver with an output voltage, the wireless power receiver further configured to:
receive wirelessly from a transmitter a voltage induced in an electromagnetic coil of the wireless receiver;
compare the received voltage to a threshold voltage; and
limit via direct shorting paths for both sides of the electromagnetic coil the output voltage provided to the hardware to less than or equal to the threshold voltage in response to the received voltage exceeding the threshold voltage, wherein
the direct shorting paths include one or more switches without a discrete impedance element connected in series to the one or more switches so as to immediately reduce the received voltage when the received voltage exceeds the threshold voltage.

16. The apparatus of claim 15, the wireless power receiver further configured to refrain from limiting the voltage in response to the voltage not exceeding the threshold voltage.

17. The apparatus of claim 15, wherein the received voltage is induced in the electromagnetic coil in the wireless power receiver.

18. The apparatus of claim 17, wherein the voltage is limited by shorting the electromagnetic coil in the wireless power receiver using at least one metal-oxide-semiconductor (MOS) device.

19. The apparatus of claim 15, wherein the output voltage is limited by shunting a current generated by the voltage in the wireless power receiver using at least one switching device.

20. The apparatus of claim 15, wherein the voltage is limited by shunting the received voltage to ground in the wireless power receiver using at least one metal-oxide-semiconductor (MOS) device.

21. The apparatus of claim 16, wherein the voltage is limited by shunting the received voltage to ground in the wireless power receiver using at least one metal-oxide-semiconductor (MOS) device.

* * * * *